April 29, 1958 S. LIVINGSTONE 2,832,376
FILLING GRATE FOR LOOMS
Filed May 31, 1955

INVENTOR.
STANLEY LIVINGSTONE
BY *Lamont Johnston*
ATTORNEY ved Apr. 29, 1958

2,832,376

FILLING GRATE FOR LOOMS

Stanley Livingstone, Chattanooga, Tenn.

Application May 31, 1955, Serial No. 512,040

8 Claims. (Cl. 139—379)

This invention relates to a filling grate for looms and more particularly to an improvement on the filling grate disclosed in U. S. Patent No. 2,672,895 to Robert M. Ingham, Jr.

The filling grate described in U. S. Patent No. 2,672,895 is coated with a polymeric material selected from the group consisting of polytetrafluoroethylene and polytrifluorochloroethylene to prevent lint from adhering to the grate surfaces with sufficient tenacity that the lint can not be removed by the routine air-hosing operations performed in the mill, as the yarn passes across the face of the grate.

It has been found that two serious disadvantages have arisen when a filling grate coated with the above polymeric materials has been used. The surface of the grate coated with either of the polymeric materials becomes considerably more slippery than the uncoated surface of the grate. Consequently, as yarn passes back and forth across the face of the grate, it tends to slide upward and off the face of the grate, thus allowing the tines of the filling fork to enter the openings of the grate, giving a false signal, and causing the loom to stop.

Another disadvantage of a grate coated with one of the polymeric materials is that neither of these materials is abrasion-resistant, and the constant and rapid movement of the yarn over the face of the grate soon wears through the polymeric material and forms grooves in the base metal of the grate.

It is therefore an object of the present invention to overcome the disadvantages enumerated and to provide the face of the grate with a material which is primarily abrasion-resistant, which has a higher frictional surface than polytetrafluoroethylene or polytrifluorochloroethylene, and which will not materially affect the lint-repellant features of the filling grate described in U. S. Patent No. 2,672,895.

The above as well as other objects are accomplished by applying only to the face, which has been pretreated with a polymeric material selected from the group consisting of polytetrafluoroethylene and polytrifluorochloroethylene, a silicone resin, a vinyl resin, a phenolic resin, a urea resin, or a polystyrene resin.

All silicone resins, and protective coatings and baking enamels containing silicone resins, are satisfactory for the purposes of this invention. Nubelon-S (Glidden), a baking enamel containing an inorganic silicone resin base combined with an alkyd resin has been proven highly successful as a face coating for the filling grates.

Vinyl resins consisting of polymerized vinyl chloride or copolymers of vinyl chloride and vinyl acetate may also be used as coatings. Particularly useful is a mixture comprising approximately 88% vinyl chloride, 6% vinyl alchol, and 3% vinyl acetate.

Pure phenolic resins, urea resins and polystyrene resins have also proven satisfactory as abrasion-resistant face coatings for the grates.

Since these resins will not adhere to the polymeric materials, the face of a grate pretreated with one of the polymeric materials should be scraped until the base metal of the grate is exposed. The face of the grate is then immersed in or sprayed with the resin and cured at a temperature of not more than 400° F., in order that the polymeric materials will not be affected by the application of the resin, for a period of 15 to 30 minutes until the resin sets. It is important that only the face, the portion of the grate which comes in contact with the yarn, be treated with the resin. Since only such a small proportion of the entire grate surface is treated with resin, the ability of the other polymeric material-treated surface to repel lint will not be materially affected. The improved grate would therefore not only be able to repel lint but would have a face with an abrasion-resistant and comparatively high-frictional wearing surface.

An alternative abrasion-resistant coating for the faces of steel grates is chromium. The chromium may be directly applied to the face of the steel grate, after which the polytetrafluoroethylene or the polytrifluorochloroethylene may be applied to the other surfaces of the steel, or the polymeric materials may be first applied to all the exposed surfaces of the grate and then removed from the face of the grate only, so that the chromium may be electroplated to the exposed steel face. The small amounts of chromium applied to the wearing surfaces of the grate will considerably extend the life of the grate without appreciably affecting the lint-repellent characteristics. Since the chromium can not be applied to the aluminum grates but only to the steel grates, the faces of the aluminum grates can only be coated with the above-named plastic resins. Although the chromium surface has a lower coefficient of friction with the yarn than do the plastic resins, it has been found that the yarn will not slip off a chromium-plated grate if the grate is maintained in the vertical position illustrated in the drawings.

Further objects and advantages of the invention will be apparent from the following description taken in conjunction with the drawing, wherein.

Figure 1:
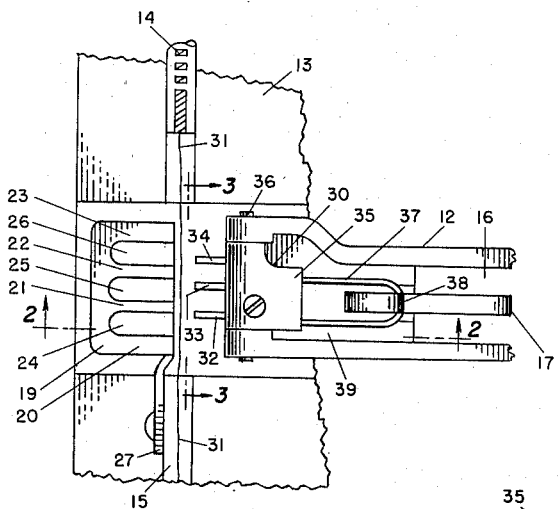
Figure 1 is a top plan view of a small portion of a loom showing the filling detecting device.

Referring more specifically to the drawings, there is illustrated a loom frame 10 on which the base 11 of the filling detecting device is secured. Mounted on the base 11, in a conventional manner, is a filling fork slide 12 free to move longitudinally. The filling fork slide has an extension, not shown, which is operatively connected with conventional means for stopping the loom.

The loom is also provided with a conventional lay 13 which moves back and forth with respect to the base 11. The loom is also equipped with a conventional reed 14 and conventional shuttle box 15, only partially illustrated.

The filling fork slide is provided with a longitudinally extending slot 16 and moving within the slot is a conventional goose neck 17 actuated by well known means, not shown.

The lay 13 is provided with the usual well or groove 18 in which grate 19 is partially positioned. The grate 19 is conventional in appearance and is provided with bars 20, 21, 22 and 23 which form openings 24, 25 and 26. The bar 20 is provided with an extension 27 which in turn is provided with an aperture 28 for attaching the grate to some portion of the lay such as the shuttle box 15.

Figure 2:
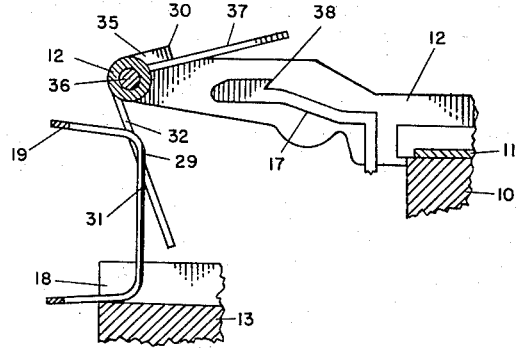
Figure 2 is a fragmentary elevation looking substantially along line 2—2 in Figure 1 and showing the grate and filling detector fork in the relative position assumed when the lay is in beat-up position.
Figure 4:
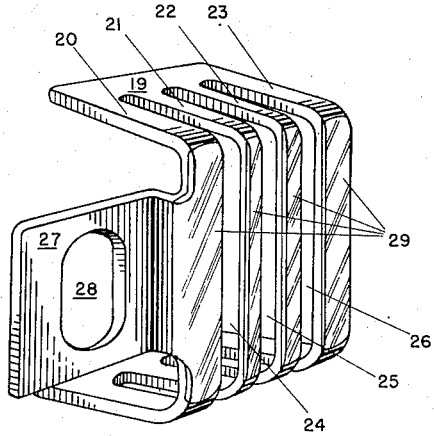
Figure 4 is a view in perspective of the improved grate, the face of which is coated with one of the abrasion-resistant materials contemplated by this invention.
Figure 3:
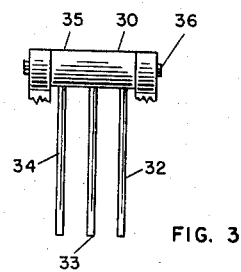
Figure 3 is a fragmentary elevation of the filling detector fork substantially along line 3—3 in Figure 1.

As best disclosed in Figs. 2 and 4, the improvement to the grate comprises coating the face of the bars 20, 21, 22, and 23 with an abrasion-resistant material 29, such as one of the silicone, vinyl, phenolic, urea, or polystyrene resins for any type of grate, or chromium for a steel grate only. As described above, the entire external surfaces of the grate may first be coated with polymeric material, which is scraped off the face, or the face coating may be applied first. The resins are baked on at a temperature not exceeding 400° F., for a period of 15 to 30 minutes until the resin sets, and the chromium is directly applied by electroplating. The remaining surfaces of the grate are coated, either before or after application of the face coating, with the polymeric materials from the group consisting of polytetrafluoroethylene and polytrifluorochloroethylene.

Pivotally mounted in the end of the filling fork slide 12 is a filling detector fork 30 so positioned to cooperate with grate 19 in detecting the presence of a filling yarn 31 extending across the front faces of the bars 20, 21, 22 and 23 on alternate picks. The filling detector fork 30 is provided with tines 32, 33 and 34 adapted to enter openings 24, 25 and 26 in grate 19 unless prevented from doing so by the presence of the filling yarn 31. The filling detector fork tines 32, 33 and 34 are rigidly affixed to block 35 which in turn is pivotally mounted, by means of pin 36 at the end of slot 16 of the filling fork slide 12. Attached to the block 35 at approximately right angles to the tines 32, 33 and 34 is a loop member 37 adapted to engage a notch 38 in goose neck 17. The loop 37 being free to pivot by virtue of pivot pin 36, normally rests on projections 39 extending from the inner sides of slot 16.

Conventional means, not illustrated, are also provided for moving the goose neck 17 longitudinally in slot 16 toward block 35 on alternate picks when the shuttle is on that side of the lay adjacent the filling detecting device. As the lay approaches full beat-up position the tines 32, 33 and 34 contact the filling yarn 31 and are pivoted about pivot pin 36 thereby raising loop 37 so that it fails to engage notch 38 in goose neck 17 when the goose neck is otherwise in proper position for engagement. On the other hand if there is no filling yarn present, the tines 32, 33 and 34 enter openings 24, 25 and 26 in grate 19, so that the filling detector fork 30 is not pivoted and loop 37 engages notch 38 in goose neck 17. When the goose neck 17 moves toward the front of the loom, it thereby, by virtue of its engagement with loop 37, slides the filling fork slide 12 forward which stops the operation of the loom. The operator can then determine for what reason there is no filling yarn present.

From the above description of the operation of the filling yarn detector it can be seen that if for any reason the times 32, 33 and 34 are prevented from entering openings 24, 25 and 26 in grate 19, the yarn detector will fail to operate even though there is no filling yarn in front of grate 19. In prior art apparatus it was found that lint soon collected on bars 20, 21, 22 and 23 of grate 19 to such an extent that it prevented tines 32, 33 and 34 from entering openings 24, 25 and 26 even though the filling yarn 31 was not present, and in such instances the loom continued to operate until the absence of the filling yarn was visually noticed by the operator. Furthermore, if for any reason the tines 32, 33 and 34 are allowed to enter the openings 24, 25, and 26 in grate 19 prematurely and in the absence of lint, the operation of the loom will be stopped. By virtue of the improvement of this invention, the grate 19 fails to collect sufficient lint to give a false test for the filling yarn, the filling yarn does not slide off the face of the grate causing a premature stoppage, and the face of the grate is provided with a hard, abrasion-resistant surface.

What is claimed is:

1. A process of treating a grate for use in a filling detecting device for a loom in which said grate cooperates with a pivoting fork having a number of tines designed to press a filling yarn against the face of the grate, the fork thereby being pivoted to indicate the presence of said filling yarn, and by passing said tines through the openings of said grate when no filling yarn is present, the fork thereby not being pivoted to indicate the absence of a filling yarn, comprising the steps of coating the face of the grate with an abrasion-resistant material selected from the group consisting of silicone resin, vinyl resin, phenolic resin, urea resin, polystyrene resin, and chromium, and coating the remaining external surfaces of the grate with a synthetic polymeric material selected from the group consisting of polytetrafluoroethylene and polytrifluorochloroethylene.

2. A process of treating a grate for use in a filling detecting device for a loom in which said grate cooperates with a pivoting fork having a number of tines designed to press a filling yarn against the face of the grate, the fork thereby being pivoted to indicate the presence of said filling yarn, and by passing said tines through the openings of said grate when no filling yarn is present, the fork thereby not being pivoted to indicate the absence of a filling yarn, comprising the steps of coating the face of the grate with an abrasion-resistant plastic resin from the group consisiting of silicone resin, vinyl resin, phenolic resin, urea resin, and polystyrene resin at a temperature of between 300° and 400° F., baking the resin on the face of the grate for a period of 15 to 30 minutes until the resin sets, and then coating the remaining external surfaces of the grate with a synthetic polymeric material selected from the group consisting of polytetrafluoroethylene and polytrifluorochloroethylene.

3. A process of treating a grate for use in a filling detecting device for a loom in which said grate cooperates with a pivoting fork having a number of tines designed to press a filling yarn against the face of the grate, the fork thereby being pivoted to indicate the presence of said filling yarn, and by passing said tines through the openings of said grate when no filling yarn is present, the fork thereby not being pivoted to indicate the absence of a filling yarn, comprising the steps of electroplating the face of the grate with chromium and then coating the remaining external surfaces of the grate with a synthetic polymeric material selected from the group consisting of polytetrafluoroethylene and polytrifluorochloroethylene.

4. The process of treating a grate coated with a synthetic polymeric material selected from the group consisting of polytetrafluoroethylene and polytrifluorochloroethylene used in filling detecting device for a loom to cooperate with a pivoting fork having a number of tines designed to press a filling yarn against the face of the grate, the fork thereby being pivoted to indicate the presence of said filling yarn, and by passing said tines through the openings of said grate when no filling yarn is present, the fork thereby not being pivoted to indicate the absence of a filling yarn, the steps comprising removing the synthetic polymeric material from the face of the grate and coating the face exposed thereby with an abrasion-resistant plastic resin from the group consisting of silicone resin, vinyl resin, phenolic resin, urea resin, and polystyrene resin.

5. The process of treating a grate coated with a synthetic polymeric material selected from the group consisting of polytetrafluoroethylene and polytrifluorochloroethylene used in a filling detecting device for a loom to cooperate with a pivoting fork having a number of tines designed to press a filling yarn against the face of the grate, the fork thereby being pivoted to indicate the presence of said filling yarn and by passing said tines through the openings of said grate when no filling yarn is present, the fork thereby not being pivoted to indicate the absence of a filling yarn, comprising the steps of removing the polymeric material from the face of the grate and electroplating the face exposed thereby with chromium.

6. In a filling detecting device for a loom said device comprising a grate and a pivoting fork having a number of tines designed to cooperate with said grate by pressing a filling yarn against the face of the grate, the fork thereby being pivoted to indicate the presence of said filling yarn, and by passing said tines through the openings of said grate when no filling yarn is present, the fork thereby not being pivoted to indicate the absence of a filling yarn, the improvement which comprises a grate having its face composed of an abrasion-resistant material selected from the group consisting of silicone resin, vinyl resin, phenolic resin, urea resin, polystyrene resin, and chromium, and in which the remaining external surfaces of the grate are composed of a synthetic polymeric material selected from the group consisting of polytetrafluoroethylene and polytrifluorochloroethylene.

7. In a filling detecting device for a loom said device comprising a grate and a pivoting fork having a number of tines designed to cooperate with said grate by pressing a filling yarn against the face of the grate, the fork thereby being pivoted to indicate the presence of said filling yarn, and by passing said tines through the openings of said grate when no filling yarn is present, the fork thereby not being pivoted to indicate the absence of a filling yarn, the improvement which comprises a grate having its face composed of an abrasion-resistant material selected from the group consisting of silicone resin, vinyl resin, phenolic resin, urea resin, and polystyrene resin, and in which the remaining external surfaces of the grate are composed of a synthetic polymeric material selected from the group consisting of polytetrafluoroethylene and polytrifluorochloroethylene.

8. In a filling detecting device for a loom said device comprising a grate and a pivoting fork having a number of tines designed to cooperate with said grate by pressing a filling yarn against the face of the grate, the fork thereby being pivoted to indicate the presence of said filling yarn, and by passing said tines through the openings of said grate when no filling yarn is present, the fork thereby not being pivoted to indicate the absence of a filling yarn, the improvement which comprises the grate having its face composed of chromium, and in which the remaining external surfaces of the grate are composed of a synthetic polymeric material selected from the group consisting of polytetrafluoroethylene and polytrifluorochloroethylene.

References Cited in the file of this patent
UNITED STATES PATENTS

| | | |
|---|---|---|
| 2,364,730 | Menking | Dec. 12, 1944 |
| 2,672,895 | Ingham | Mar. 23, 1954 |